Fig.3.

J. F. WENTWORTH.
INTERNAL COMBUSTION ENGINE.
APPLICATION FILED FEB. 26, 1915.

1,225,295.

Patented May 8, 1917.
6 SHEETS—SHEET 4.

WITNESSES:

INVENTOR.

UNITED STATES PATENT OFFICE.

JOHN F. WENTWORTH, OF QUINCY, MASSACHUSETTS.

INTERNAL-COMBUSTION ENGINE.

1,225,295.    Specification of Letters Patent.    Patented May 8, 1917.

Application filed February 26, 1915. Serial No. 10,833.

*To all whom it may concern:*

Be it known that I, JOHN F. WENTWORTH, a citizen of the United States, residing at 27 Miller Stile road, Quincy, in the county of Norfolk and State of Massachusetts, have invented certain new and useful Improvements in Internal-Combustion Engines, of which the following is a specification.

This invention has for its aim primarily to produce a small engine which shall be non-stallable and which shall be able to use non-volatile fuel. At the same time the principles here disclosed are to a certain degree applicable to larger size units than this class mentioned.

To produce a non-volatile engine of small size it is necessary that the engine can be started by hand in order to avoid the danger of a loss of injection air. To start even a small engine by hand it is necessary to have a low pressure of compression. To fire non-volatile fuel with a low pressure of compression it is necessary that the engine be first warmed by some means unless a hot bulb or local heat of some sort be used. The applicant has proven by experiment that it is possible to fire non-volatile fuel in a water-jacketed engine at pressures far below those now used in the non-volatile engine of the type known as Diesel. The particular means for accomplishing this result is to reduce the compression pressure by means of varying the amount of air or mixture drawn into the engine by means of closing the admission valve before the end of the suction stroke. In this way with the use of a volatile mixture it is possible to start this engine by hand as the ordinary gasolene engine is started. To run on non-volatile fuel it is necessary to have an air spray to feed the fuel into the cylinder. It is proposed to run this engine on gasolene mixture till sufficient air pressure is generated to feed the fuel, at which time the engine will have been in this way sufficiently warmed so that it will fire the non-volatile fuel at a pressure of not over 175 lbs. In order to increase the efficiency and also the power of this engine it is proposed to feed the fuel into the cylinder either before the end of the compression stroke or if at the end of the compression stroke at such a rate that the pressure of combustion will be very essentially above the maximum pressure of compression.

These then constitute the essentials of this invention. In order to produce these results it has been found advisable to make certain modifications over the present devices used in the so-called Diesel type. These variations will be described in the specification and covered in the claims.

The basic idea of this invention is to produce a means for heating the engine cylinder so that a low pressure of compression will suffice to ignite the injection charge of fuel. The other elements coöperate with this element so as make possible a small sized unit.

In the accompanying drawing forming a part of this specification,

Fig. 4^A is an elevation of the fuel pump.

In the ten figures will be shown the use of gasolene for hand starting made possible by the applicant's demonstration of the possibility to run this type of engine under varying pressures of compression. The means for warming up the engine, so that low pressures of compression can be used to ignite heavy oils, is the operation on a volatile fuel for a limited time. An arrangement of fuel pump and fuel valves which, while slightly more complicated than present devices, is absolutely positive in action, and means for automatically maintaining a constant injection air pressure without a loss of efficiency is shown. While the means shown for feeding the fuel is of vital importance in engines of smallest sizes the same arrangement would give better results in larger engines.

The same numerals refer to the same parts in all figures.

Figure 1:
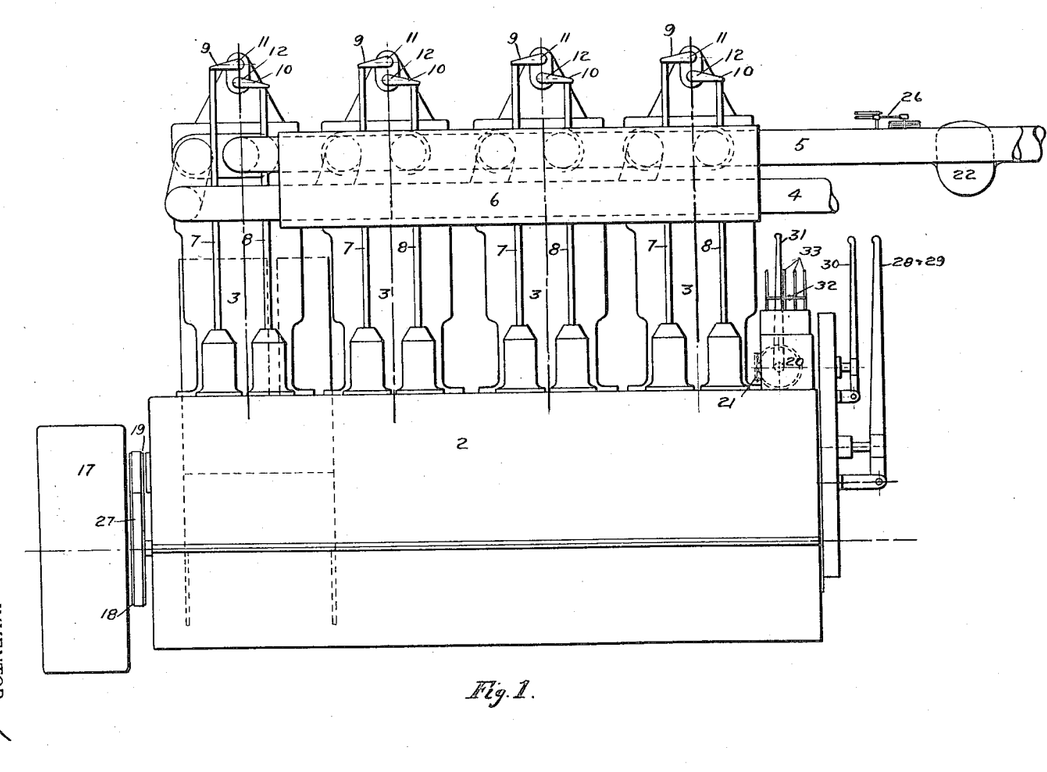
Figure 1 is a side elevation of the engine, which is here shown as a four cylinder and four cycle type.
Figure 4:
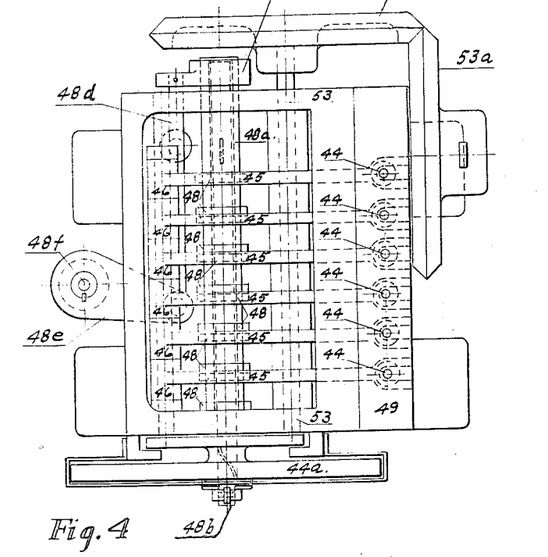
Fig. 4 is a plan of the fuel pump.

Referring more particularly to Fig. 1 of the drawings, the numeral 1 represents the base, 2 the crank case, 3 the cylinders, 4 the exhaust pipe and 5 the admission pipe. These pipes 4 and 5 are shown running through a sheet metal casing 6 which will serve to keep the inlet pipe 5 warm in cold weather. The tappet rods operating the admission valves are shown by 7 and the rods for the exhaust valves are shown by 8. The rods 7 and 8 respectively strike the levers 9 and 10 which rotate the shafts 11 and 12 which in turn operate the admission valves 13 and the exhaust valves 14 respectively through the arms 15 and 16. The flywheel by means of which the engine can also be manually started is designated by the numeral 17. 18 is a pulley on the shaft, 19 is a pulley on the air compressor shaft. 20 is the fuel pump a general type arrangement of which is shown in Figs. 4 and $4^A$. 21 is the timing arrangement for the electrical ignition of the engine when running on a volatile fuel. 22 is the carbureter on the branch pipe 23. Butterfly valves are located on the pipes 5 and 23 at 24 and 25 respectively. These valves or dampers are connected together by a system of links 26 so that either pipe can be used. The two pulleys 18 and 19 are connected by the belt 27. 28 and 29 are control levers for the cam shafts for the admission and exhaust valves and for the fuel valves respectively. 30 is the lever for controlling the action of the fuel pump with respect to the element of time and 31 is the lever for controlling the pump with respect to the element of quantity of fuel delivered per stroke. The fuel enters the pump by means of the pipe 32 and goes to the respective fuel valves by means of the pipes 33.

Figure 2:
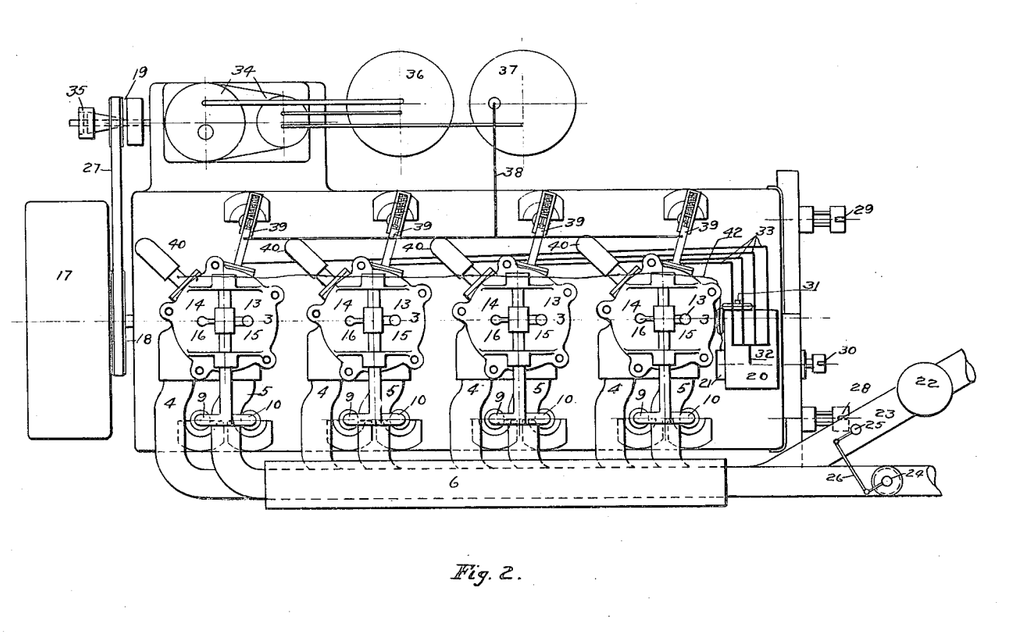
Fig. 2 is a plan of the same engine.

In Fig. 2 in addition to the elements mentioned above the numeral 34 indicates the two stage air compressor and 35 its clutch. 36 is the intermediate receiver and 37 is the high pressure receiver. 38 is the air pipe supplying the fuel valves 39 with high pressure air for spraying the fuel into the cylinders 3. 40 is a combined relief valve and spark plug. The relief valve is to prevent excessive pressure in the cylinders in case of irregular action of the fuel pump and the spark plug is for the ignition of the volatile mixture for starting. By combining these two elements or by putting the points of the spark plug in the disk of the relief valve one opening is done away with in the head of the cylinder. This is the only reason for a combination of these two elements.

Figure 3:
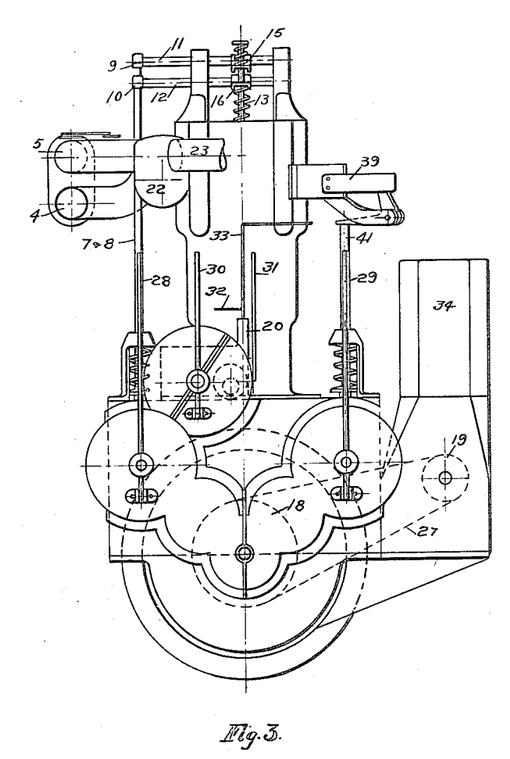
Fig. 3 is an end elevation.

In Fig. 3 is also shown the tappet rods 41 for operating the fuel valves 39. In addition there is a means for determining the time that the fuel valves remain open. This is not shown on the first three figures however in order to avoid confusion. It is shown however in Fig. 6. The wiring for the electrical ignition is shown in Fig. 2 by numeral 42. All four wires are bound together in one cable so that they show as one wire. The cam shafts for the admission and exhaust valves and for the fuel valves are shown driven from the main shaft by the usual two to one gearing. The engine here shown is a regular four cycle type. Fig. $4^A$ shows an elevation of the fuel pump as it would be designed for a six cylinder engine. Fig. 4 is a plan of the same pump. 43 is the casing of the pump. $44^a$ is the gear which meshes with a similar sized gear $44^b$ which may be so placed on either of the cam shafts or otherwise placed so as to give the pump a number of strokes equal to the working strokes of the engine. Each cylinder has its own plunger 44. Each plunger has a lever 45 which pivots at 46 and has lugs or projections as shown at 47. These lugs 47 are engaged by their respective cams 48. The plungers 44 are guided by the pump barrels 49 and the guides 50. At the lower end of the plungers 44 are nuts or shoulders 51 and between 51 and 50 are the springs 52. At 53 is an eccentric shaft which can be rotated by means of lever 31 operating gear $53^a$ which in turn operates gear $53^b$ keyed to said eccentric shaft 53. Any means for providing a degree of rotation of said shaft 53 may be employed with the same results shown as by the arrangement shown in Figs. 4 and $4^A$.

The cams 48 consist of a complete set of forward and backing cams for each plunger. The construction is simple and hence is not shown in detail. The cams 48 are secured to a sleeve $48^a$. This sleeve $48^a$ is slidable upon shaft $48^b$. The means for controlling this movement is the lug $48^c$, rod $48^d$ and arm $48^e$ which is pivoted at $48^f$. $48^e$ is oscillated by either a direct connection from $48^e$ to lever 28 or by a connection with the cam sleeve for the admission and exhaust valves. This connection is not shown here. No skill is required to devise several methods for producing this result. It is simply essential that as the forward cams of the engine are thrown into operation the forward fuel pump cams shall operate the plungers 44. When the engine is being started or reversed the lugs 47 will engage no cams and when the engine is backing under power the fuel cams for the reverse or backing cycle will be engaged by the lugs 47.

The fuel cam sleeve $48^a$ is secured to the cam shaft $48^b$ by means of a spiral key and keyway, not shown, so that as lever 30 is moved the cams will be advanced or retarded and the delivery of the fuel to the fuel valve will be consequently advanced or retarded with regard to the position of the piston on its stroke.

The theory of this pump is entirely new and novel and was suggested by the applicant's experiments. It was found that a fuel pump will operate with much greater reliability with short and sudden strokes than will be the case with a slow, steady and regular motion as is now the case in the present oil engines. To produce this condition the pump as shown was worked up. The plungers are stationary for the major part of the time. When the engine piston is in the proper position the fuel valve opens and fuel is delivered to the fuel valve by means of the impulse given to the plunger 44 by the arm or lever 45 which is lifted by the combined effect of the cam 48 and the lug 47. This constitutes the delivery stroke and the suction stroke is caused by means of the springs 52 which return the plunger to its original position. The governing is accomplished by means of the eccentric shaft 53. It is possible to so design this pump that in the extreme position of 53 the plungers 44 will not move because the lugs 47 will be lifted beyond the reach of the cams 48. In the other position of 53 the plungers 44 will be brought to the lowest possible position and the maximum amount of fuel will be delivered.

The construction here shown is not considered to be important. It is desired to merely show means for manufacturing a fuel pump which will deliver a varying amount of fuel at a varying time in the stroke of the engine, and to be able to do away with the present type of fuel pump which is delivering the fuel for substantially one half of the total operating time of the engine and which is on the suction stroke for the other half of the time. This feature may no doubt be produced by other means now that the need for such a feature has been demonstrated.

Figure 5:
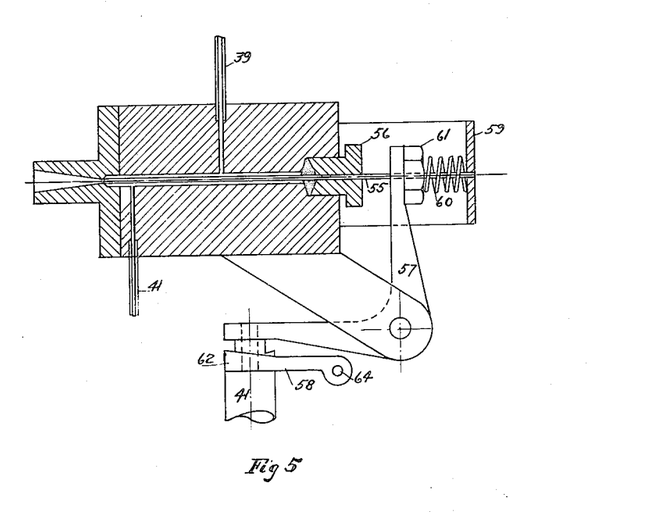
Fig. 5 shows the fuel valve in elevation and Fig. 6 shows the arrangement of fuel valves and air and oil piping.

Fig. 5 shows the fuel valve in section. 39 represents the main valve casting. 55 is the valve stem or valve spindle. 56 is a gland to make the valve pressure tight. 57 is a bell crank lever which is operated by the fuel valve tappet rod 41 and by engaging the nut 61 on the valve spindle 55 unseating the fuel valve and allowing compressed air to flow into the cylinder. In flowing into the cylinder this stream of compressed air strikes the spurt of fuel being driven into the cylinder by means of the impact of the fuel pump plunger. The fuel valve is seated by means of the spring 60 which is compressed between the nut 61 and the backing 59 when the valve is opened. 41 is the oil pipe from the fuel pump and 38 is the air pipe from the air compressor. Between the tappet rod 41 and the bell crank lever 57 there is a take up member 58. One end of 58 has a spirally inclined surface shown at 62. The other end has an eye 64 which the rod 63 shown in Fig. 6 engages. By rotating 58 by means of the rod 63 it is possible to vary the length of time that the fuel valve remains open.

Figure 6:
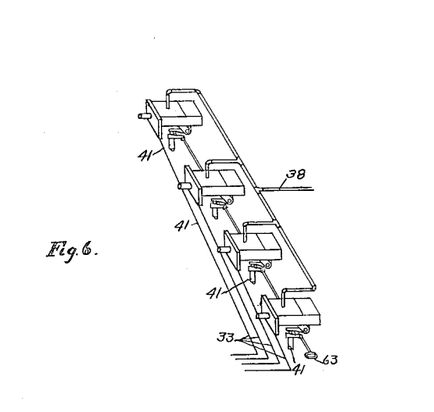

An assembly of the four fuel valves with their piping, etc., is shown in Fig. 6.

Figure 7:
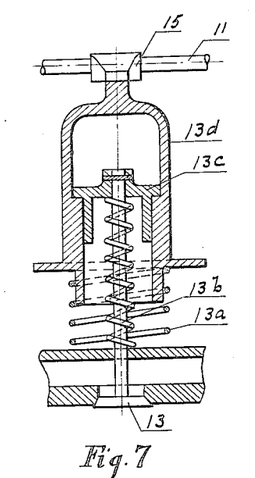
Fig. 7 is a section of the admission valve and springs shown longitudinally.
Figure 8:
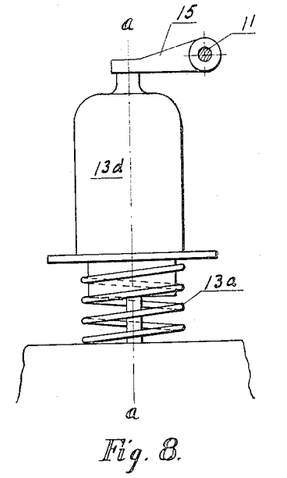
Fig. 8 is the same feature shown in elevation transversely.

Fig. 7 is a transverse elevation of the admission valve and Fig. 8 is an elevation shown longitudinally and not in section.

13 is the admission valve, 13$^a$ is a short heavy spring bearing on a shoulder of 13$^d$. 13$^b$ is a longer, lighter spring bearing against a collar 13$^c$ fastened to the end of the valve stem. The angle of advance of the admission cam can be altered by means of lever 28 shown in Figs. 1, 2, 3 and 9. By this means the action of arm 15 is varied. For full stroke the arm depresses 13$^d$ before the end of the exhaust stroke compressing the heavy spring 13$^a$. The valve 13 is now held against its seat by a light spring. At the beginning of the suction stroke the admission valve is unseated by the partial vacuum produced by the suction stroke. The cam operating the arm 15 through the elements described releases 13$^d$ at the end of the suction stroke and the valve is seated by means of the action of the springs in the normal method. For another way of describing this action it may be said that for full load the action is similar to a mechanically operated valve except the opening of the admission valve is accomplished by unlocking the valve and letting the suction in the cylinder open the valve, while the valve is closed by the action of the heavy spring when the mechanism releases the compression on said spring.

For securing a partial compression the admission cam is advanced releasing the lock and allowing the valve to open at the proper time as an automatic valve. The valve can be closed at any time by releasing the compression on said spring 13$^a$ which lifts 13$^d$ and 13$^d$ in turn engages the shoulder provided on 13$^c$ and closes the valve regardless of the amount of vacuum in the cylinder at the time. The amount of air compressed per stroke will in this way be regulated by the advance given the cam by means of the lever 28 which operates a spiral key engaging the sleeve which carries the cam.

Figure 9:
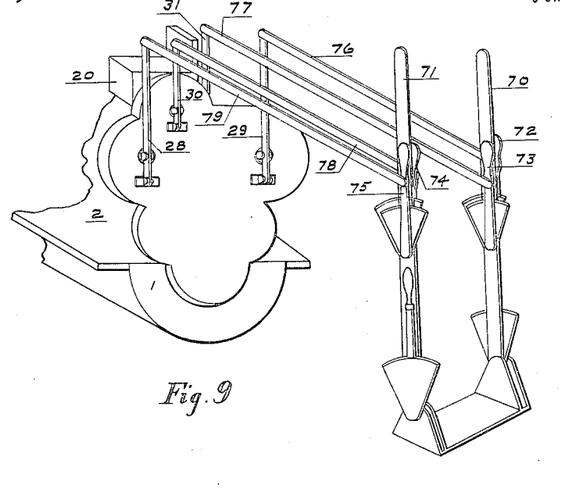
Fig. 9 is an assembly of the control levers.

Fig. 9 shows how the engine can be easily reversed. Lever 71 carries the two rods 78 and 79 respectively. Lever 70 carries the rods 76 and 77 which engage the levers 29 and 31 respectively. These rods 76, 77, 78 and 79 are connected to their respective levers by small levers 72, 73, 74 and 75 respectively, each being supplied with proper locking devices. So by means of lever 71 the amount of air compressed per stroke and the timing of the fuel pump can be regulated together. By means of lever 70 the timing of the fuel valve and the amount of fuel fed can be regulated. By means of the small levers 72, 73, 74 and 75 any one of the four regulations can be obtained irrespective of the others. The arrangement here shown is but one of the many means which could be provided for accomplishing the same end.

Operation.

Assuming the engine is as it leaves the work bench powerless to start except for the strength of the operator. First prime the fuel valves by means of the lever 31 which must be moved back and forth by hand. As soon as the fuel pipes are full (which can perhaps be better determined by installing an overflow back to the main tank and an indicator) prime the carbureter. Manipulate the lever or link 26 so as to cut out the atmospheric air and cut in the gasolene mixture. Cut out the fuel valve by means of the rod 63 Fig. 6 and throw in the electrical switch connecting the batteries with the spark plug through the timing arrangement 21. See that the fuel pump and fuel valve are timed to operate at the end of the compression stroke. Make sure that the fuel pump is disconnected. Set the admission valve at minimum compression by means of the lever 28. Now give the engine several turns by hand till the mixture ignites from the spark. With a 40 pound pressure of compression this can easily be done by hand on reasonable size engines. Run the engine idle on gasolene till the pressure in the high pressure air tank is around 500 lbs. By this time the engine will be warm enough to ignite heavy oil on the maximum compression of around 175 lbs. As quickly as possible throw the fuel pump into full stroke, give the fuel valve its full opening, give the engine its full compression and cut out the gasolene mixture and cut in the pure air. When this is done the electrical connection can be broken to save the batteries which will not be needed till the engine has been stopped. This sounds formidable but since there is a relation between most of these movements, in a commercial engine it will be possible to couple these elements so as to reduce the number of movements. This arrangement is shown in Fig. 9. If this be done by the use of both hands the gasolene can be cut out, the fuel pump started up, the fuel valves thrown in, atmospheric air thrown in and the engine given full compression all at one movement. This coupling should not be made rigid so but what the compression, for instance, could be reduced without touching the gasolene feed. This would mean a certain coupling of these elements for the sole purpose of changing from gasolene to oil. This simply involves adapting the engine to the needs of the service but does not call for any change in the principle of the engine.

In this engine no circulating water supply has been shown or circulating water pipes. This engine must have water supplied to the water jackets but in this detail the engine varies none from the gasolene engine which it is designed to displace. It might be well to use a little care to prevent the water jackets from being given too much water in the winter. The cylinders of an engine of this sort must be at least warm to the hand. For efficiency's sake a gasolene engine should be warm to the touch. A gasolene engine will run when quite cold however, but this type of oil engine must be kept warm or it will miss fire and stall. This does not mean for the cylinders to be run smoking hot but most certainly to be kept warm.

I claim—

1. In an internal combustion engine, a cylinder, means for admitting air at atmospheric pressure to the cylinder, means for compressing said air to the ignition temperature of the fuel, means for admitting fuel to the cylinder at the beginning of the working stroke, means for varying the amount of air admitted to the cylinder and means for first warming the cylinder through the operation on the volatile mixture cycle.

2. In an internal combustion engine, a cylinder, means for admitting air at atmospheric pressure to the cylinder, means for compressing said air to the ignition temperature of the fuel, means for admitting fuel to the cylinder at substantially the beginning of the working stroke, means for varying the amount of air admitted to the cylinder, and means whereby said engine may be started by the use of a volatile mixture and an ignition device.

3. In an internal combustion engine, a cylinder, means for admitting air for compression, means for compressing said air to a point above the ignition point of the fuel to be injected, means for injecting the fuel at substantially the beginning of the working stroke, means for varying the amount of air compressed per stroke and means for warming said cylinder whereby the ignition point of said fuel may be obtained at a lower pressure than is possible in a cold engine.

4. In an internal combustion engine, a cylinder, means for admitting air for compression, means for compressing said air to a point above the ignition point of the fuel, means for injecting the fuel at substantially the end of the compression stroke, means for varying the amount of charge compressed per stroke, means for warming said cylinder so that the ignition point of the fuel may be below the pressure necessary in a cold cylinder, a fuel pump, means for operating said fuel pump so that the fuel may be delivered to the fuel valve substantially during the opening of the fuel valve and means for varying the duration of the opening of the fuel valve.

5. In an internal combustion engine, a cylinder, means for admitting air for compression, means for compressing air to a point above the ignition point of the fuel, means for injecting the fuel at substantially the end of the compression stroke, means for varying the amount of charge compressed per stroke, means for warming said cylinder whereby the ignition point of the fuel may occur at a lower point of compression than would be the case in a cold engine, said means consisting of a carbureter on a branch of the air inlet pipe, of an ignition device on said cylinder and of a timing device and means whereby the engine may be run either by the volatile mixture when the engine is cold or by the nonvolatile fuel after the engine has been warmed by the operation of the engine on the volatile fuel.

6. In an internal combustion engine, a cylinder, means for admitting air for compression, means for compressing the air to a point above the ignition point of the fuel, a fuel pump, a fuel valve, means for varying the amount of charge compressed per stroke, means for warming said cylinder so that the ignition point may occur at a pressure below the ignition point in a cold cylinder, means for so controlling the operation of said fuel pump that the charge of fuel may be delivered to the fuel valve substantially during the opening of the fuel valve, means for varying the amount of fuel delivered and means for varying the timing and duration of the opening of the fuel valve.

JOHN F. WENTWORTH.

Witnesses:
 ANNIE JOSEPHINE RYDER,
 GEORGE H. RYDER,
 JOHN F. WENTWORTH, Jr.